United States Patent
Goto

(10) Patent No.: US 7,249,171 B2
(45) Date of Patent: Jul. 24, 2007

(54) SERVICE CONTROL SYSTEM AND COMPUTER PROGRAM

(75) Inventor: Yoshimitsu Goto, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1038 days.

(21) Appl. No.: 10/246,743

(22) Filed: Sep. 19, 2002

(65) Prior Publication Data

US 2004/0059804 A1 Mar. 25, 2004

(51) Int. Cl.
*G06F 15/173* (2006.01)
*G06F 15/16* (2006.01)

(52) U.S. Cl. ............... 709/223; 709/203; 709/229

(58) Field of Classification Search ............ 709/203, 709/206, 220, 223, 224, 229, 238, 239, 242
See application file for complete search history.

(56) References Cited

U.S. PATENT DOCUMENTS

| | | | |
|---|---|---|---|
| 6,782,379 B2 * | 8/2004 | Lee ..................... | 707/2 |
| 6,976,066 B1 * | 12/2005 | Mouhanna et al. ......... | 709/223 |
| 7,031,933 B2 * | 4/2006 | Harper ................ | 705/26 |
| 2001/0003827 A1 * | 6/2001 | Shimamura ............. | 709/206 |
| 2002/0147806 A1 * | 10/2002 | Hasegawa .............. | 709/223 |

FOREIGN PATENT DOCUMENTS

| | | |
|---|---|---|
| JP | 2001-17715 A | 1/2001 |
| JP | 2001-282944 A | 10/2001 |
| JP | 2001-282945 A | 10/2001 |

* cited by examiner

*Primary Examiner*—Ario Etienne
*Assistant Examiner*—El Hadji Sall
(74) *Attorney, Agent, or Firm*—Foley & Lardner LLP

(57) ABSTRACT

There is provided a service control system including a service side system and a customer side system including a service target machine, and the service side system includes a service client terminal which converts set data relative to the service target machine into XML data and edits it and a mail server which transmits to the customer side system an email concerning service setting including the set data, and remotely manages the service target machine by including a predetermined command in the email concerning the service setting.

10 Claims, 2 Drawing Sheets

SERVICE CONTROL SYSTEM AND COMPUTER PROGRAM

BACKGROUND OF THE INVENTION

The present invention relates to a system using, e.g., email, and more particularly to a service control system and a computer program used to realize a service, such as maintenance, with respect to a service target machine, e.g., a copy machine on a customer side system, a complex machine, etc., using email from a service side system.

In general, when carrying out a service such as maintenance with respect to a service target machine, e.g., a copying machine or a complex machine, a service agent must go to a site and individually carry it out. Such a service involving service personnel involves a cost and is also complex. Therefore, this is not preferable for a customers.

In order to solve such a problem, there has been developed a system which realizes services through a network, such as the Internet, from a service center.

In this system, however, an excessive burden is imposed on a local area network (LAN) on the customer side when carrying out the service. Further, when there are a plurality of service target machines, the service center must be individually connected to and access a service target machine, which involves labor and complicated processes.

BRIEF SUMMARY OF THE INVENTION

It is an object of the present invention to remove the necessity for continuous connection between a service side system and a customer side system through a network, by realizing a service concerning a service target machine in the customer side system by using email, and also improve the cost by using the network and lighten the load on the network.

To achieve this aim, according to a first aspect of the present invention, there is provided a service control system comprising a service side system and a customer side system including a service target machine, wherein the service side system includes a service client terminal which realizes XML data from set data with respect to the service target machine, and edits the XML data and a mail server which transmits an email concerning service setting including the set data to the customer side system, and the service target machine is remotely managed by including a predetermined command in the email concerning the service setting.

Further, according to a second aspect of the present invention, there is provided a computer program which controls a service side system which remotely manages a service target machine by realizing XML data from set data with respect to the service target machine and editing the XML data by a service client terminal, transmitting an email concerning service setting including the set data to the customer side system by a mail server, and including a predetermined command in the email concerning the service setting.

According to a third aspect of the present invention, there is provided a computer program which controls a customer side system, wherein the computer program transmits a first email to a service side system by converting a problem into the form of XML data when that problem occurs in a service target machine, and reads data included in a second email upon receiving the second email returned from the service side system, thereby coping with the problem based on the data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A preferred embodiment according to the present invention will now be described hereinafter with reference to the accompanying drawings.

Figure 1:
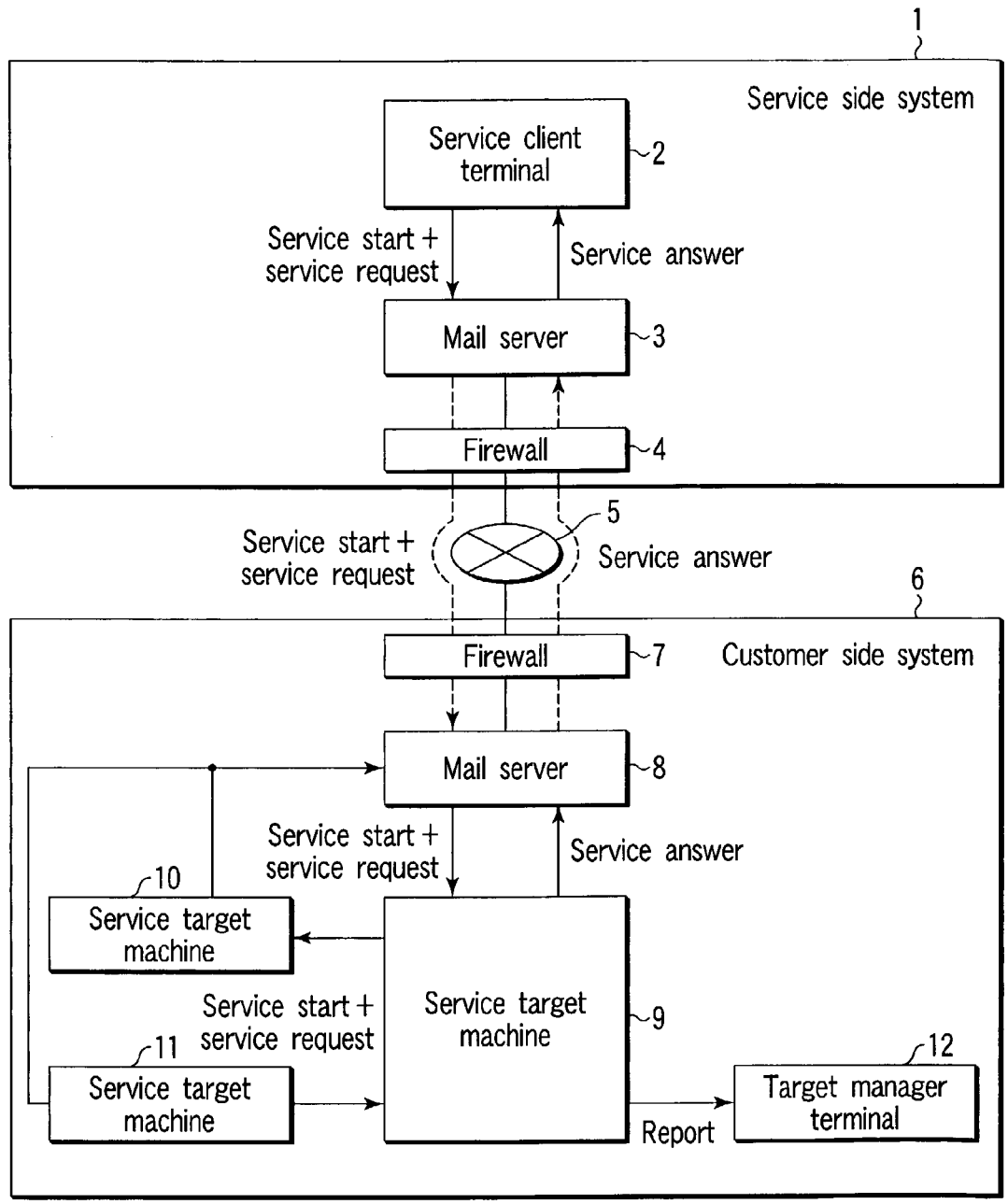
FIG. 1 is a structural view showing a service control system to which an embodiment according to the present invention can be applied.

A structure and an effect of a service control system according to the embodiment of the present invention will now be first described in detail in conjunction with FIG. 1.

In this service control system, a service side system 1 and a customer side system 6 are connected so as to be capable of communicating with each other through a network 5 such as the Internet.

In more detail, the service side system 1 consists of a service client terminal 2, a mail server 3 and a firewall 4. The service client terminal 2 and the mail server 3 are connected so as to be capable of communicating with each other through a LAN.

The customer side system 6 consists of a firewall 7, a mail server 8, service target machines 9, 10 and 11, and a target machine manager terminal 12. The mail server 8, the service target machines 9, 10 and 11 and the target machine manager terminal 12 are connected so as to be capable of communicating with each other through a LAN. In this example, although three service target machines 9, 10 and 11 are illustrated, the number of the machines is not restricted to three. When a plurality of the service target machines are provided in the customer side system 6, the service target machine 9 functions as a main machine. In this case, the other service target machines 10 and 11 function as sub-machines.

The Mail Server mentioned above is of a type which transmits/receives emails to/from the Internet, or is utilized in a closed network such as a LAN. The mail servers 3 and 8 mean the former, and a protocol called SMTP (Simple Mail Transfer Protocol) or the like is adopted for them. Moreover, the firewalls 4 and 7 correspond to a system for security provided at the boundary between the network 5 and the systems 1 and 6. The security in the systems 1 and 6 is enhanced by restricting access from the outside by the firewalls 4 and 7.

Figure 2:
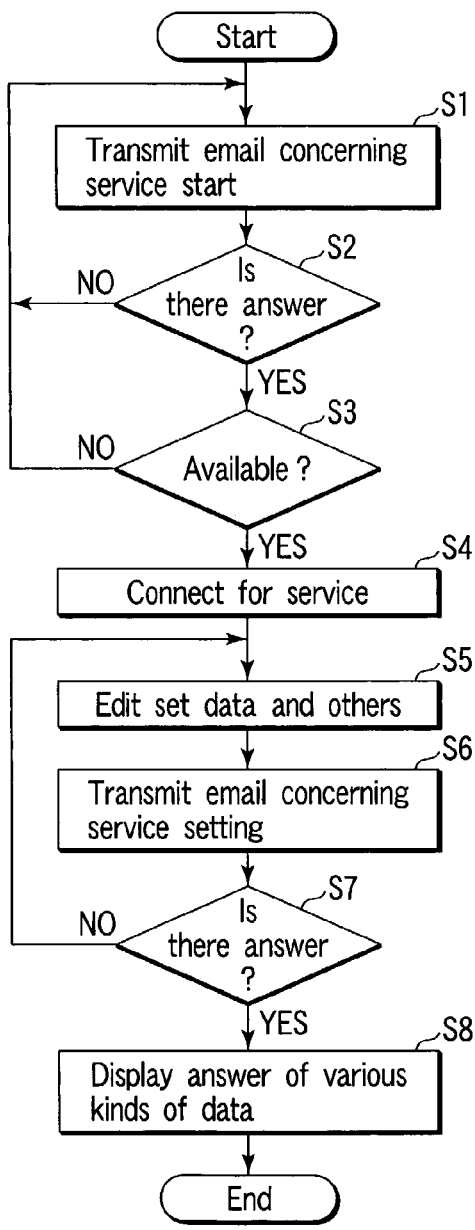
FIG. 2 is a flowchart showing a set operation of a service target machine by a service side system of the service control system to which the embodiment according to the present invention can be applied.

The set operation of the service target machine by the service control system according to the embodiment of the present invention will now be described with reference to a flowchart of FIG. 2.

The service client terminal 2 in the service side system 1 first transmits an email concerning start of the service to the customer system 6 through the mail server 3, the firewall 4 and the network 5. When there is no response to the email concerning start of the service from the customer side system 6, or when the customer side system 6 cannot be connected because it is busy for example, it is determined that connection for the service has failed and the service client terminal 2 in the service side system 1 again transmits the mail concerning start of the service (steps S1 to S3).

On the other hand, when there is a response from the customer side system 6 with respect to the email concerning start of the service and the customer side system 6 can be connected, connection for the service is established between the both systems (step S4).

Then, the service client terminal 2 in the service side system 1 transmits the email concerning service setting to the customer side system 6 through the mail server 3, the firewall 4 and the Internet 5 (steps S5 and S6).

The email concerning service setting is obtained by editing set data or the like in the form of XML data by the service client terminal 2.

For example, when the content of the email concerning service setting is a request of data (counter or the like representing the number of the service target machines 9, 10 and 11 in service), the service target machine 9, 10 or 11 which has received the email transmits data edited into the XML data format to the service side system 1 through an email.

On the other hand, when the content of the email concerning service setting is set data of the service target machines 9, 10 and 11 (program update of each machine or the like), the service target machine 9, 10 or 11 which has received the email performs predetermined setting based on the set data included in the email, and then informs the service side system 1 of a result.

Upon receiving the email returned from the service target machine 9, 10 or 11 in the customer side system 6 (step S7), the service side system 1 displays a predetermined response concerning various kinds of data (step S8).

In this way, the set operation of the service target machine is completed.

Note that connection when a plurality of the service target machines 9, 10 and 11 are provided in the customer side system 6 is basically the same as connection when one service target machine is provided in the customer side system 6. However, accesses to the sub-machines 10 and 11 by the service side system 1 are all carried out through the main machine 9.

Figure 3:
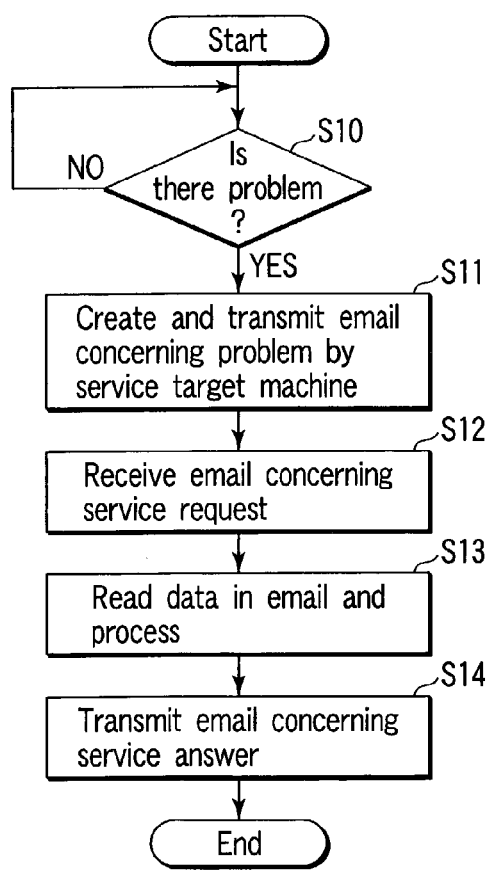
FIG. 3 is a flowchart showing an operation by a customer side system of the service control system to which the embodiment according to the present invention can be applied.

A detailed description will now be given as to a series of operations when a problem occurs in the service target machines 9 to 11 provided in the customer side system 6 of the service control system according to the embodiment of the present invention, with reference to a flowchart of FIG. 3.

When a problem occurs (step S10), the service target machines 9, 10 or 11 transmits the problem in the form of XML data to the service side system 1 by an email through the mail server 8, the firewall 7 and the Internet 5 (step S11). Incidentally, when a plurality of the service target machines 9, 10 and 11 exist in the customer side system 6 at the time of occurrence of this type of problem, the respective sub-machines 10 and 11 also directly transmit emails to the service side system 1 without using the main machine 9.

The service client terminal 2 informs a service agent that the service target machine 9, 10 or 11 has the problem. After notification of the service problem, the service agent judges whether the problem can be remedied, and transmits an answer in the form of an email concerning a service request to the service target machine 9, 10 or 11.

Upon receiving the email concerning the service request (step S12), the service target machine 9, 10 or 11 reads data included in the email and performs processing if possible (step S13). Then, the service target machine 9, 10 or 11 reports the result of the service by transmitting that result to the target machine manager terminal 12 by email (step S14).

In this way, a series of operations by the customer side system 6 are terminated.

Here, in the service control system according to the embodiment of the present invention, various functions are respectively realized by the following commands. Note that the device in the following description corresponds to the service target machines 9 to 11 or the like.

1) Automatic Order Function

An automatic order function is realized by an order item set command and a command to set an order receiver/an orderer. The former order item set command includes data concerning a toner, a drum and paper, and realizes selection of consumable supplies to be automatically ordered. The latter order receiver/orderer set command includes data concerning a customer (an address, a telephone number and an email address) and an order receiver's address, and realizes setting for ordering each consumable supply by a customer.

2) Customer/device Information Function

The customer/device information function is realized by a command to set device information, a command to acquire a device maintenance history, and a command to acquire each log/list of a device. The device information set command includes data concerning a customer name, a device name, a serial number and an address, and realizes registration of customer information to the device. The command to acquire a device maintenance history includes data concerning a date, a service personnel name, a maintenance measure, and realizes acquisition of a history of the conducted maintenance. The command to acquire each log/list of the device includes data concerning a print log, a FAX log and a device error log, and realizes acquisition of the log/list set in the device.

3) Charge Management Function

The charge management function is realized by a command to acquire each counter information. The command to acquire each counter information includes data concerning a copy counter and a scanner counter, and realizes acquisition of a counter value of an operation (copy or the like) which can be a target of charging.

4) Program Update Function

The program update function is realized by a command to rewrite firmware and a command to rewrite an application installed in the device. The former firmware rewrite command includes data concerning engine firmware and scan firmware, and realizes rewriting by transmitting the firmware of the device. The latter command to rewrite the application installed in the device includes data concerning a printer driver and a FAX driver, and realizes rewriting by transmitting an application installed in the device.

5) Device Adjustment Code Set Function

The device adjustment code set function is realized by a command to read a value of each adjustment code and a command to set a value of each adjustment code. The former command to read a value of each adjustment code includes data concerning printing adjustment, print range adjustment and density setting, and realizes reading of a value of an adjustment code of the device. The latter command to set a value of each adjustment code includes data concerning printing adjustment, print range adjustment and density setting, and realizes setting of a new value as a value of the adjustment code of the device.

6) Self-test Function

The self-test function is realized by a command of a test result of the device. This command of a test result of the device includes data concerning a test content, and realizes testing of parts of the device and acquisition of a result.

7) Backup Function for All Information

The backup function for all information is realized by a command to back up all information of the device (acquires all information from the device). This command to back up all information of the device (acquires all information from the device) includes the above-described beneficial information, and realizes backup of all of the device information and saving it in a client PC.

According to the foregoing embodiment of the present invention, the service target machine is remotely operable through email, and the number of field trips by a service agent can be reduced. In addition, the necessity for continuous use of the network can be removed by using email, thereby achieving improvement in cost by use of the network and lightening of the burden on the network. Additionally, the connection setting with respect to each device in the service side system does not have to be changed by conducting management of a plurality of the service target machines through email. Further, the set data edited in the service side system can be collectively transmitted by transmitting emails to the service target machines, and it is possible to suppress the excessive burden imposed on the network by collectively transmitting/receiving data.

The present invention includes the following.

In the service side system, the present invention provides the service control method characterized by converting set data with respect to the service target machine into XML data and edits it by the service client terminal, transmitting to the customer side system an email concerning service setting including the set data by the mail server, and remotely managing the service target machine by including a predetermined command in the email concerning the service setting.

In this service control method, when the customer side system has a plurality of the service target machines, the mail server in the service side system transmits an email to one service target machine which is a representative machine, and this representative machine transfers the email to other service target machines.

Further, in this service control method, the service side system receives an order of a consumable supply selected by the customer side system by including the order item set command as the predetermined command in the email concerning the service setting, and receives an order of each consumable supply set by the customer side system by including the order receiver/orderer set command as the predetermined command.

Furthermore, in this service control method, the service side system receives registration of the customer information of the service target machine by including the device information set command as the predetermined command in the email concerning the service setting, and acquires the history information of the conducted maintenance by including the device maintenance history acquisition command as the predetermined command, and acquires the log/list concerning the service target machine by including the command to acquire each log/list of the device as the predetermined command.

Moreover, in this service control method, the service side system acquires a counter value of the operation which can be a target of charting by including the command to acquire each counter information as the predetermined command in the email concerning the service setting.

In addition, in this service control method, the service side system updates various programs of the service target machine by including the command to rewrite the firmware or the command to rewrite the application software installed in the device as the predetermined command in the email concerning the service setting.

Additionally, in this service control method, the service side system acquires a value of the adjustment code of the service target machine by including the command to read a value of each adjustment code as the predetermined command in the email concerning the service setting, and sets a value of the adjusting code of the service target machine to a new value by including the command to set a value of each adjustment code as the predetermined command.

Further, in this service control method, the service side system acquires a result of testing each part in the device by including the test result command of the device as the predetermined command in the email concerning the service setting.

Furthermore, in this service control method, the service side system acquires information of all the service target machines by including the command to back up all information of the device as the predetermined command in the email concerning the service setting.

Moreover, in this service control method, when a problem occurs, the service target machine converts the problem into the XML data format and transmits the first email to the service side system, and reads data included in the second email upon receiving the second email returned from the service side system and solves the problem based on the data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A service control system comprising:
a customer side system including a service target machine; and
a service side system including a service client terminal which converts set data relative to the service target machine into XML data and edits the XML data, and a mail server which transmits an email concerning service setting including the set data to the customer side system,
wherein the service side system performing an automatic order function, a customer/device information function, a charge management function, a program update function, a device adjustment code set function, a self-test function, and a backup function for all information by including a predetermined command in the email concerning the service setting.

2. The service control system according to claim 1, wherein when the customer side system has a plurality of service target machines, the mail server of the service side system transmits an email to one service target machine which is a representative machine, and the representative machine transfers the email to other service target machines.

3. The service control system according to claim 1, wherein the service side system receives an order of a consumable supply selected by the customer side system by including an order item set command as the predetermined command in the email concerning the service setting, and receives an order of each consumable supply set by the customer side system by including a command to set an order receiver and orderer as the predetermined command.

4. The service control system according to claim 1, wherein the service side system receives registration of customer information of the service target machine by including a command to set device information as the predetermined command in the email concerning the service setting, acquires history information of conducted maintenance by including a command to acquire device maintenance history as the predetermined command, and acquires a log/list concerning the service target machine by including a command to acquire each log/list of the device as the predetermined command.

5. The service control system according to claim 1, wherein the service side system acquires a counter value of an operation which can be a target of charging by including a command to acquire each counter information as the predetermined command in the email concerning the service setting.

6. The service control system according to claim 1, wherein the service side system updates various programs of the service target machine by including a command to rewrite firmware or a command to rewrite an application software installed in the device as the predetermined command in the email concerning the service setting.

7. The service control system according to claim 1, wherein the service side system acquires a value of an adjustment code of the service target machine by including a command to read a value of each adjustment code as the predetermined command in the email concerning the service setting, and sets a value of the adjustment code of the service target machine to a new value by including a command to set a value of each adjustment code as the predetermined command.

8. The service control system according to claim 1, wherein the service side system acquires a result of testing each part of the device by including a test result command of the device as the predetermined command in the email concerning the service setting.

9. The service control system according to claim 1, wherein the service side system acquires information of all the service target machines by including a command to back up all information of the device as the predetermined command in the email concerning the service setting.

10. The service control system according to claim 1, wherein the service target machine converts a problem into an XML data format and transmits a first email to the service side system when the problem occurs, and reads data included in a second email and solves the problem based on the data upon receiving the second email returned from the service side system.

* * * * *